United States Patent
Augustine

(10) Patent No.: US 10,899,380 B2
(45) Date of Patent: Jan. 26, 2021

(54) STEERING ASSEMBLY

(71) Applicant: STEERING SOLUTIONS IP HOLDING CORPORATION, Saginaw, MI (US)

(72) Inventor: Michael Augustine, Mayville, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 133 days.

(21) Appl. No.: 16/206,191

(22) Filed: Nov. 30, 2018

(65) Prior Publication Data

US 2020/0172155 A1  Jun. 4, 2020

(51) Int. Cl.
*B62D 5/04* (2006.01)
*F16H 25/22* (2006.01)

(52) U.S. Cl.
CPC ....... *B62D 5/0448* (2013.01); *F16H 25/2209* (2013.01); *F16C 2326/24* (2013.01)

(58) Field of Classification Search
CPC .............. B62D 5/0448; F16H 25/2209
See application file for complete search history.

(56) References Cited

U.S. PATENT DOCUMENTS

| | | | | |
|---|---|---|---|---|
| 3,572,158 A * | 3/1971 | Adams | ............. | B62D 3/123 74/498 |
| 4,215,591 A * | 8/1980 | Bishop | ............. | B62D 3/123 74/422 |
| 5,086,661 A * | 2/1992 | Hancock | ............. | B62D 1/185 74/493 |
| 6,921,096 B2 * | 7/2005 | Yang | ............. | B62D 3/123 280/93.514 |
| 9,469,333 B2 * | 10/2016 | Takei | ............. | B62D 3/126 |
| 2005/0061575 A1 * | 3/2005 | Abe | ............. | B62D 3/123 180/444 |
| 2005/0229733 A1 * | 10/2005 | Osterlanger | ............. | B62D 3/123 74/422 |
| 2010/0052280 A1 * | 3/2010 | Bilmayer | ............. | F16H 25/24 280/93.514 |

* cited by examiner

*Primary Examiner* — Vicky A Johnson
(74) *Attorney, Agent, or Firm* — Dickinson Wright PLLC

(57) ABSTRACT

A steering assembly includes a steering member and an adjustment assembly. The steering member has a first side, a second side adjacent the first side, a third side adjacent the second side and disposed opposite the first side, and a fourth side adjacent the third side and disposed opposite the second side. The adjustment assembly includes a first adjustment member and a second adjustment member. The first adjustment member is arranged to apply a first biasing force to the first side and a second biasing force to the second side. The second adjustment member is arranged to engage the third side and the fourth side.

18 Claims, 3 Drawing Sheets

STEERING ASSEMBLY

STATEMENT REGARDING FEDERALLY SPONSORED RESEARCH OR DEVELOPMENT

None.

BACKGROUND

Steering systems may employ a ball screw that converts a rotational input into a linear steering output to pivot at least one vehicle road wheel. A rack assist electric power steering system may include a ball screw that is fixed to a member, such as a rack. In such a system, a ball screw torque may cause rotation of the member that may result in an error in steering gear and rack mesh alignment.

SUMMARY

Disclosed is a steering assembly that includes a non-cylindrical steering member and an adjustment assembly. The non-cylindrical steering member extends along a central axis between a first end and a second end through a housing. The non-cylindrical steering member has a first side, a second side extending from the first side, a third side extending from the second side and disposed opposite the first side, and a fourth side extending from the third side and disposed opposite the second side. The adjustment assembly includes a first adjustment member and a second adjustment member. The first adjustment member is arranged to apply a first biasing force to the first side and a second biasing force to the second side. The second adjustment member is arranged to engage the third side and the fourth side.

Also disclosed is a steering assembly that includes a steering member and an adjustment assembly. The steering member has a first side, a second side adjacent the first side, a third side adjacent the second side and disposed opposite the first side, and a fourth side adjacent the third side and disposed opposite the second side. The adjustment assembly includes a first adjustment member and a second adjustment member. The first adjustment member is arranged to apply a first biasing force to the first side and a second biasing force to the second side. The second adjustment member is arranged to engage the third side and the fourth side.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
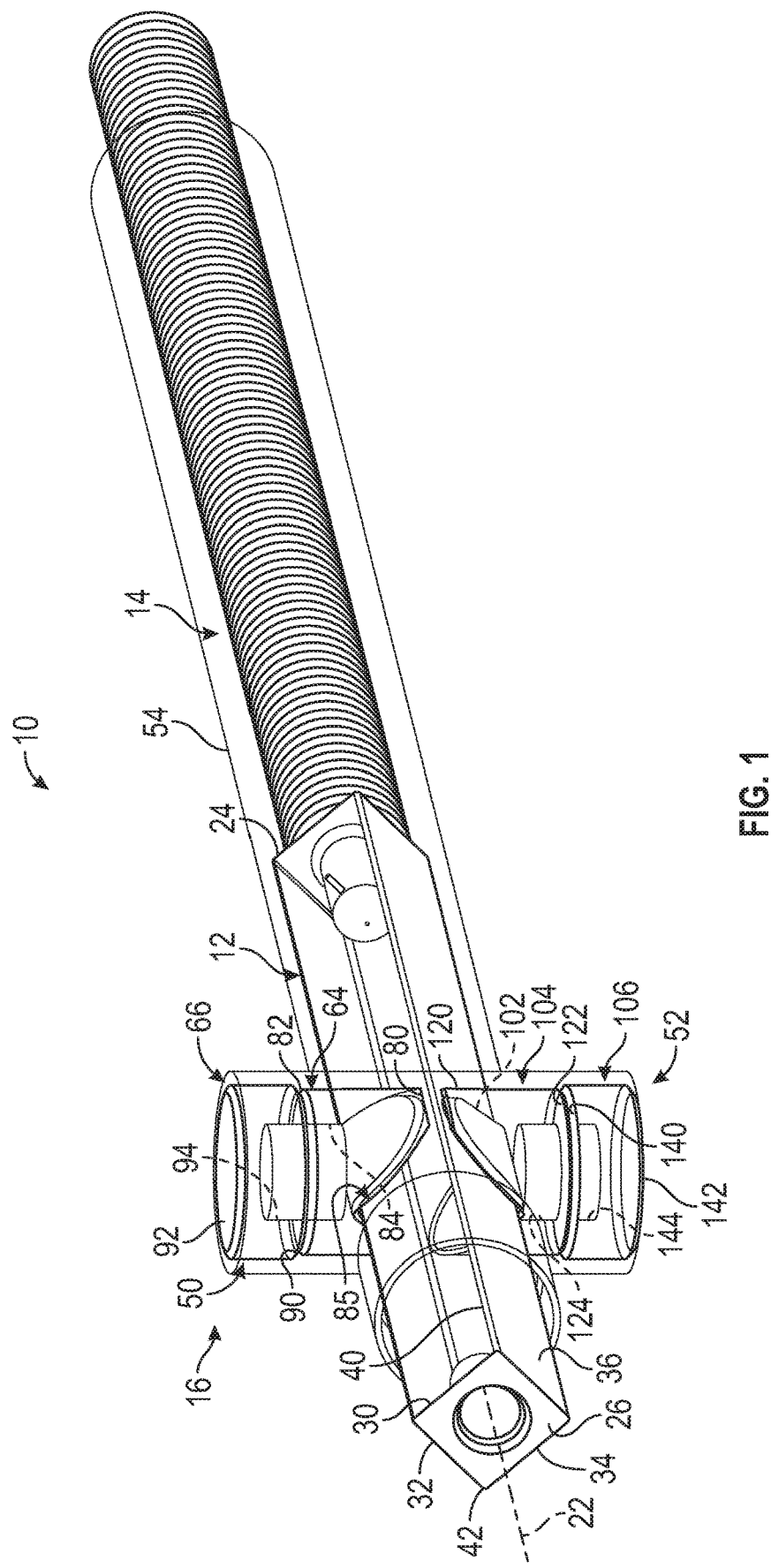
FIG. 1 is a first perspective view of a steering assembly having an adjustment assembly.
Figure 2:
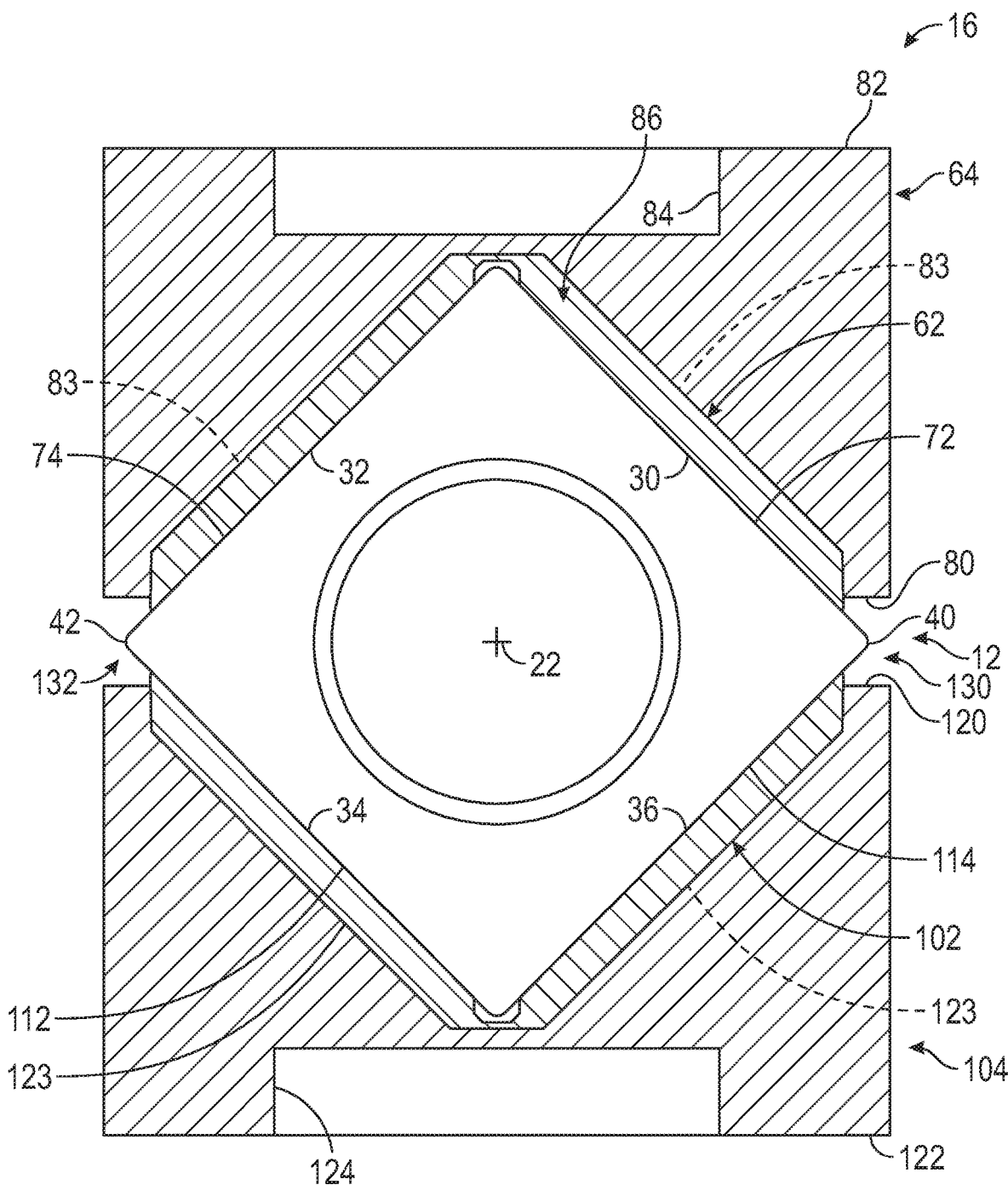
FIG. 2 is an end view of a portion of the steering assembly having adjuster plugs of the adjustment assembly removed.
Figure 3:
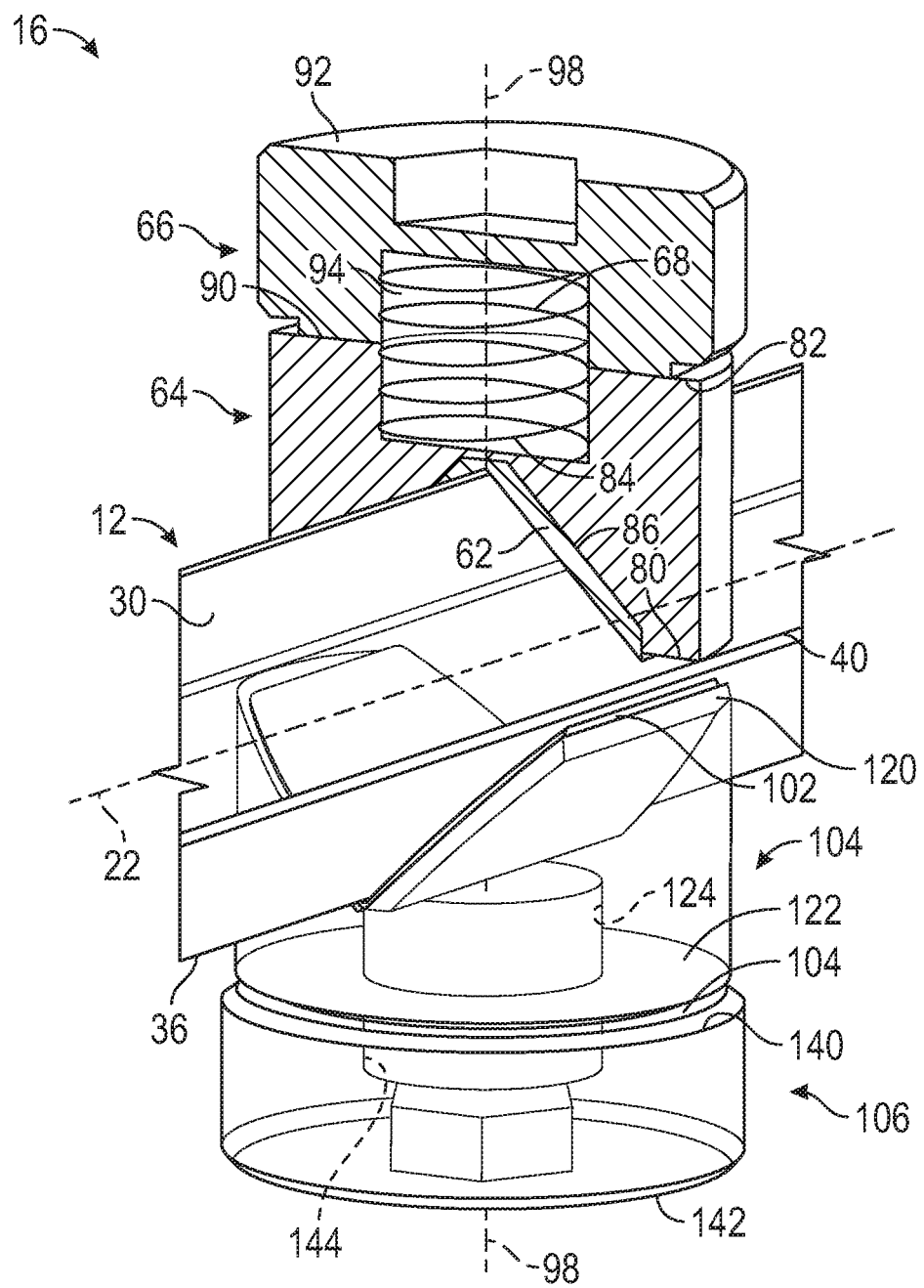
FIG. 3 is a partial section view of the steering assembly having the adjustment assembly.

Referring to FIGS. 1-3, a steering assembly 10 is shown. The steering assembly 10 may be provided with an autonomous vehicle, a partially autonomous vehicle, semi-autonomous vehicle, a selectively autonomous vehicle or a conventional vehicle. The steering assembly 10 may be a ball screw assisted steering system having a steering member 12, a ball screw 14, and an adjustment assembly 16.

The steering member 12 may be a non-cylindrical steering member having a prismatic bar with a polygonal section or may have a substantially rectangular, rhomboid, or square prismatic shape having sides that are disposed orthogonal to each other. The non-cylindrical steering member 12 extends along a central axis 22 between a first end 24 and a second end 26 through a housing 54. The non-cylindrical steering member 12 may present greater section properties as compared to traditional round steering racks.

The non-cylindrical steering member 12 includes a first side 30, a second side 32 extending from the first side 30, a third side 34 extending from the second side 32, and a fourth side 36 extending from the third side 34. The second side 32 is disposed adjacent to or orthogonal to the first side 30 and the third side 34. The third side 34 is disposed adjacent to or orthogonal to the second side 32 and the fourth side 36. The third side 34 is disposed substantially opposite the first side 30. The fourth side 36 is disposed adjacent to or orthogonal to the third side 34 and the first side 30. The fourth side 36 is disposed substantially opposite the second side 32.

The non-cylindrical steering member 12 defines a first edge 40 and a second edge 42 that is disposed opposite the first edge 40, as shown in FIGS. 1 and 2. The first edge 40 is defined between or defined at a junction between the first side 30 and the fourth side 36. The second edge 42 is defined between or defined at a junction between the second side 32 and the third side 34.

The ball screw 14 may extend into the first end 24 of the non-cylindrical steering member 12. The ball screw 14 and the non-cylindrical steering member 12 may be formed as separate components that are later joined together at a joint such as a vented light press male-female joint within interfacial weld where position and orientation of the ball screw 14 and the non-cylindrical steering member 12 are controlled by the cylindrical interface. The ball screw 14 and the non-cylindrical steering member 12 may be joined with friction weld, laser weld, or other similar joint. The ball screw 14 and the non-cylindrical steering member 12 may be integrally formed together. At least one tie rod or other connection member extends from the second end 26 of the non-cylindrical steering rack 12 and/or the outboard end of ball screw 14. The ball screw 14 engages a ball nut, a series of ball members, and a powered transmission to convert rotary motion into linear motion that translates the non-cylindrical steering member 12 along the central axis 22 to cause the tie rod or connection member to pivot and/or steer at least one vehicle wheel.

The adjustment assembly 16 includes a first adjustment member 50 that is arranged to engage a first pair of adjacent surfaces or orthogonal surfaces of the non-cylindrical steering member 12 and includes a second adjustment member 52 that is arranged to engage a second pair of adjacent surfaces or orthogonal surfaces of the non-cylindrical steering member 12 that are disposed substantially opposite the first pair of adjacent surfaces. The first adjustment member 50 and the second adjustment member 52 are physically independent of each other and independently apply biasing forces to surfaces of the non-cylindrical steering member 12 to at least apply ball-nut torque reaction forces to inhibit rotation of the non-cylindrical steering member 12 and the ball screw 14 about the central axis 22. The first adjustment member 50 and the second adjustment member 52 may extend through or be supported by a housing 54 through which the non-cylindrical steering member 12 extends.

The first adjustment member 50 is arranged to apply a first biasing force to the first side 30 and is arranged to apply a second biasing force to the second side 32. The first adjustment member 50 includes a first reaction pad 62, a first plunger 64, a first adjuster plug 66, and a first biasing member 68.

The first reaction pad 62 extends at least partially across the first side 30 and the second side 32 of the non-cylindrical steering member 12. The first reaction pad 62 may include separate and distinct reaction pads having a first pad portion that engages the first side 30 and a separate and distinct second pad portion that engages the second side 32. The first pad portion and the second pad portion being spaced apart from each other at a junction between the first side 30 and the second side 32. The first reaction pad 62 defines a first engagement surface 72 disposed adjacent to or engages the first side 30 and a second engagement surface 74 disposed adjacent to or engages the second side 32.

The first reaction pad 62 may be affixed to the first plunger 64 through a common backing that is affixed to the first plunger 64 or may be at least partially disposed within or extends into the first plunger 64, as shown in FIGS. 2 and 3. The first reaction pad 62 may be integrally formed with the first plunger 64 such that the first reaction pad 62 is a raised surface of the first plunger 64 that engages adjacent or orthogonal surfaces of the non-cylindrical steering member 12.

The first plunger 64 fits into a first bore of the housing 54 and is arranged to move within the first bore. The first plunger 64 at least partially receives or defines the first reaction pad 62. The first plunger 64 extends between a first plunger first end 80 and a first plunger second end 82. The first reaction pad 62 may be at least partially disposed in a first cavity or a first relief 83 that extends from the first plunger first end 80 towards the second plunger end 82. The first plunger 64 defines a first plunger cavity 84 that extends from the first plunger second end 82 towards the first plunger first end 80.

The first plunger 64 defines a v-shaped or notched first region 86 that extends from the first plunger first end 80 towards the first plunger second end 82. The first region 86 is arranged to receive at least a portion of the first side 30 and the second side 32 of the non-cylindrical steering member 12. The first region 86 includes a pair of surfaces that are disposed in a non-parallel relationship with respect to each other.

Referring to FIGS. 1 and 3, the first adjuster plug 66 extends at least partially through the housing 54 through which the non-cylindrical steering member 12 extends. The first adjuster plug 66 is provided with external threads that engage with the housing 54 to position the first adjuster plug 66. The first adjuster plug 66 is movably or adjustably connected to the housing 54 and/or the first plunger 64.

The first adjuster plug 66 extends between a first adjuster plug first end 90 and a first adjuster plug second end 92. The first adjuster plug first end 90 is disposed proximate the first plunger second end 82. The first adjuster plug first end 90 may be movable relative to the first plunger second end 82. The first adjuster plug 66 defines a first adjuster plug cavity 94 that extends from the first adjuster plug first end 90 towards the first adjuster plug second end 92.

Referring to FIG. 3, the first biasing member 68 is disposed within or extends between the first plunger 64 and the first adjuster plug 66. The first biasing member 68 extends between the first adjuster plug cavity 94 and the first plunger cavity 84. The first biasing member 68 is arranged to apply a biasing force to the first plunger 64 such that the first biasing force is applied to the first side 30 and the second biasing force is applied to the second side 32 through the first reaction pad 62. The movement of the first adjuster plug 66 relative to the first plunger 64 varies the first biasing force and varies the second biasing force. During operation the position of first adjuster plug 66 is established with respect to the housing 54, for example by a threaded connection, such that a small initial gap exists between the first plunger second end 82 and the first adjuster plug first end 90. The first biasing member 68 pushes or urges the first plunger 64 into contact with non-cylindrical steering member 12. Steering assist and tie rod loads may cause displacement of the first plunger 64 along a centerline axis 98 of the adjustment member 50, 52 that is disposed transverse to the central axis 22 against the restoring force of the first biasing member 68 and/or the first adjuster plug 66. This displacement is limited by the initial gap between the first plunger second end 82 and the first adjuster plug first end 90.

The second adjustment member 52 is disposed opposite the first adjustment member 50. The second adjustment member 52 may be disposed directly opposite the first adjuster member 50 or may be disposed opposite the first adjustment member 50 but axially spaced apart from the first adjustment member 50 along the central axis 22. The second adjustment member 52 is arranged to engage the third side 34 and the fourth side 36 of the non-cylindrical steering member 12.

The second adjustment member 52 may be affixed, unsprung, to the housing 54 through which the non-cylindrical steering member 12 at least partially extends. The second adjustment member 52 may be arranged to apply a third biasing force to the third side 34 and a fourth biasing force to the fourth side 36 should the second adjustment member 52 to affixed, sprung, to the housing 54 through which the non-cylindrical steering member 12 at least partially extends.

The second adjustment member 52 includes a second reaction pad 102, a second plunger 104, a second adjuster plug 106, and a second biasing member 108.

The second reaction pad 102 extends at least partially across the third side 34 and the fourth side 36 of the non-cylindrical steering member 12. The second reaction pad 102 may include separate and distinct reaction pads having a first pad portion that engages the third side 34 and a separate and distinct second pad portion that engages the fourth side 36. The first pad portion and the second pad portion being spaced apart from each other at a junction between the third side 34 and the fourth side 36. The second reaction pad 102 defines a third engagement surface 112 disposed adjacent to or engages the third side 34 and a fourth engagement surface 114 disposed adjacent to or engages the fourth side 36.

The second reaction pad 102 may be affixed to the second plunger 104 through a common backing that is affixed to the second plunger 104 or may be at least partially disposed within or extends into the second plunger 104, as shown in FIGS. 2 and 3. The second reaction pad 102 may be integrally formed with the second plunger 104 such that the second reaction pad 102 is a raised surface of the second plunger 104 that engages adjacent or orthogonal surfaces of the non-cylindrical steering member 12.

The second plunger 104 fits into a second bore of the housing 54 that may be aligned with the first bore that receives the first plunger 64. The second plunger 104 is arranged to move within the second bore. The second plunger 104 at least partially receives or defines the second reaction pad 102. The second plunger 104 extends between a second plunger first end 120 and a second plunger second end 122. The second reaction pad 102 may be at least partially disposed in a second cavity or second relief 123 that extends from the second plunger first end 120 towards the second plunger second end 122. The second plunger 104 defines a second plunger cavity 124 that extends from the second plunger second end 122 towards the second plunger first end 120.

The second plunger 104 defines a v-shaped or notched second region 126 that extends from the second plunger first end 120 towards the second plunger second end 122. The second region 126 is arranged to receive at least a portion of the third side 34 and the fourth side 36 of the non-cylindrical steering member 12. The second region 126 includes a pair of surfaces that are disposed in a non-parallel relationship with respect to each other.

The first plunger first end 80 is spaced apart from the second plunger first end 120 such that the first edge 40 of the non-cylindrical steering member 12 extends into a first void 130 and the second edge 42 of the non-cylindrical steering member 12 extends into a second void 132 that is disposed opposite the first void 130, as shown in FIG. 2.

Referring to FIGS. 1 and 3, the second adjuster plug 106 extends at least partially through the housing 54 through which the non-cylindrical steering member 12 extends. The second adjuster plug 106 is provided with external threads that engage with the housing 54 to position the adjuster plug 66. The second adjuster plug 106 is movably or adjustably connected to the housing 54 and/or connected to the second plunger 104.

The second adjuster plug 106 extends between a second adjuster plug first end 140 and a second adjuster plug second end 142. The second adjuster plug first end 140 is disposed proximate the second plunger second end 122. The second adjuster plug first end 140 may be movable relative to the second plunger second end 122. The second adjuster plug 106 defines a second adjuster plug cavity 144 that extends from the second adjuster plug first end 140 towards the second adjuster plug second end 142.

Referring to FIG. 3, a second biasing member 108 may be disposed within or between the second plunger 104 and the second adjuster plug 106. The second biasing member 108 extends between the second adjuster plug cavity 144 and the second plunger cavity 124. The second biasing member 108 is arranged to apply a biasing force to the second plunger 104 such that a third biasing force is applied to the third side 34 and a fourth biasing force is applied to the fourth side 36 through the second reaction pad 102. The movement of the second adjuster plug 106 relative to the second plunger 104 varies the third biasing force and varies the fourth biasing force. During operation the position of second adjuster plug 104 is established with respect to the housing 54, for example by a threaded connection, such that a small initial gap may exist between the second plunger second end 122 and the second adjuster plug first end 140. The second biasing member 108 or the second adjuster plug 106 when unspring, pushes or urges the second plunger 104 into contact with non-cylindrical steering member 12. Steering assist and tie rod loads may cause displacement of the second plunger 14 along the centerline axis 98 of the adjustment member 50, 52 that is disposed transverse to the central axis 22 against the restoring force of the second biasing member 108 and/or the second adjuster plug 106. This displacement is limited by the initial gap between the second plunger second end 122 and the second adjuster plug first end 140.

Should the second biasing member 108 not be provided with the second adjustment member 52, the third biasing force and the fourth biasing force may instead be reaction forces. In such an arrangement, a first reaction force results proximate the third side 34 in reaction to the first biasing force applied to the first side 30 of the non-cylindrical steering member 12. Further, a second reaction force results proximate the fourth side 36 in reaction to the second biasing force applied to the second side 32 of the non-cylindrical steering member 12.

The first adjustment member 50 and the second adjustment member 52 of the adjustment assembly 16 interface with the prismatic polygon shape of the non-cylindrical steering member 12 to provide an anti-rotate function. The first adjustment member 50 and the second adjustment member 52 provide reaction locations or reaction surfaces to oppose the rotation or twisting of the combination of the non-cylindrical steering member 12 and the ball screw 14 about the central axis 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering assembly, comprising:
    a non-cylindrical steering member, extending along a central axis between a first end and a second end through a housing, the non-cylindrical steering member having a first side, a second side extending from the first side, a third side extending from the second side and disposed opposite the first side, and a fourth side extending from the third side and disposed opposite the second side; and
    an adjustment assembly, comprising:
    a first adjustment member arranged to apply a first biasing force to the first side and a second biasing force to the second side, and
    a second adjustment member arranged to engage the third side and the fourth side.

2. The steering assembly of claim 1, the non-cylindrical steering member is a prismatic bar with a polygonal section.

3. The steering assembly of claim 1, the first adjustment member, comprising:
    a first reaction pad extending at least partially across the first side and the second side, the first reaction pad defining a first engagement surface disposed adjacent the first side and a second engagement surface disposed adjacent the second side.

4. The steering assembly of claim 3, the first adjustment member, further comprising:
a first plunger disposed within a first bore of the housing, the first plunger extending between a first plunger first end and a first plunger second end, the first plunger defining a first plunger cavity that extends from the first plunger second end towards the first plunger first end.

5. The steering assembly of claim 4, the first reaction pad extends at least partially into the first plunger first end.

6. The steering assembly of claim 4, the first adjustment member, further comprising:
a first adjuster plug that is movably connected to the housing, the first adjuster plug extending between a first adjuster plug first end and a first adjuster plug second end, the first adjuster plug defining a first adjuster plug cavity that extends from the first adjuster plug first end towards the first adjuster plug second end.

7. The steering assembly of claim 6, the first adjustment member, further comprising:
a first biasing member extending between the first adjuster plug cavity and the first plunger cavity.

8. The steering assembly of claim 7, movement of the first adjuster plug relative to the first plunger varies the first biasing force to the first side and varies the second biasing force to the second side.

9. The steering assembly of claim 1, the second adjustment member, comprising:
a second reaction pad extending at least partially across the third side and the fourth side, the second reaction pad defining a third engagement surface disposed adjacent the third side and a fourth engagement surface disposed adjacent the fourth side.

10. The steering assembly of claim 9, the second adjustment member, further comprising:
a second plunger extending between a second plunger first end and a second plunger second end.

11. The steering assembly of claim 10, the second reaction pad extends at least partially into the second plunger first end.

12. The steering assembly of claim 10, the second adjustment member, the first plunger first end is spaced apart from the second plunger first end such that a first edge of the non-cylindrical steering member that is defined between the first side and the fourth side extends into a first void.

13. The steering assembly of claim 12, the first plunger first end is spaced apart from the second plunger first end such that a second edge of the non-cylindrical steering member that is defined between the second side and the third side extends into a second void that is disposed opposite the first void.

14. The steering assembly of claim 1, further comprising:
a ball screw extending from the first end of the non-cylindrical steering member.

15. The steering assembly claim 1, the first adjustment member and the second adjustment member being arranged to inhibit rotation of the non-cylindrical steering member about the central axis.

16. A steering assembly, comprising:
a steering member having a first side, a second side adjacent the first side, a third side adjacent the second side and disposed opposite the first side, and a fourth side adjacent the third side and disposed opposite the second side; and
an adjustment assembly, comprising:
a first adjustment member arranged to apply a first biasing force to the first side and a second biasing force to the second side, and
a second adjustment member arranged to engage the third side and the fourth side.

17. The steering assembly of claim 16, the first adjustment member, comprising:
a first plunger disposed within a first bore of a housing through which the steering member extends, the first plunger defining a first plunger cavity that extends from a first plunger second end towards a first plunger first end;
a first adjuster plug adjustably connected to the housing, the first adjuster plug defining a first adjuster plug cavity that extends from a first adjuster plug first end disposed proximate the first plunger second end towards a first adjuster plug second end; and
a first biasing member extending between the first adjuster plug cavity and the first plunger cavity, arranged to facilitate application of the first biasing force to the first side and the second biasing force to the second side via a first reaction pad.

18. The steering assembly of claim 17, the second adjustment member, comprising:
a second plunger disposed within a second bore of the housing, the second plunger defining a second plunger cavity that extends from a second plunger second end towards a second plunger first end;
a second adjuster plug adjustably connected to the housing through which the steering member extends, the second adjuster plug defining a second adjuster plug cavity that extends from a second adjuster plug first end disposed proximate the second plunger second end towards a second adjuster plug second end; and
a second biasing member extending between the second adjuster plug cavity and the second plunger cavity, arranged to facilitate application of a third biasing force to the third side and a fourth biasing force to the fourth side via a second reaction pad.

* * * * *